United States Patent Office 3,605,320
Patented Sept. 20, 1971

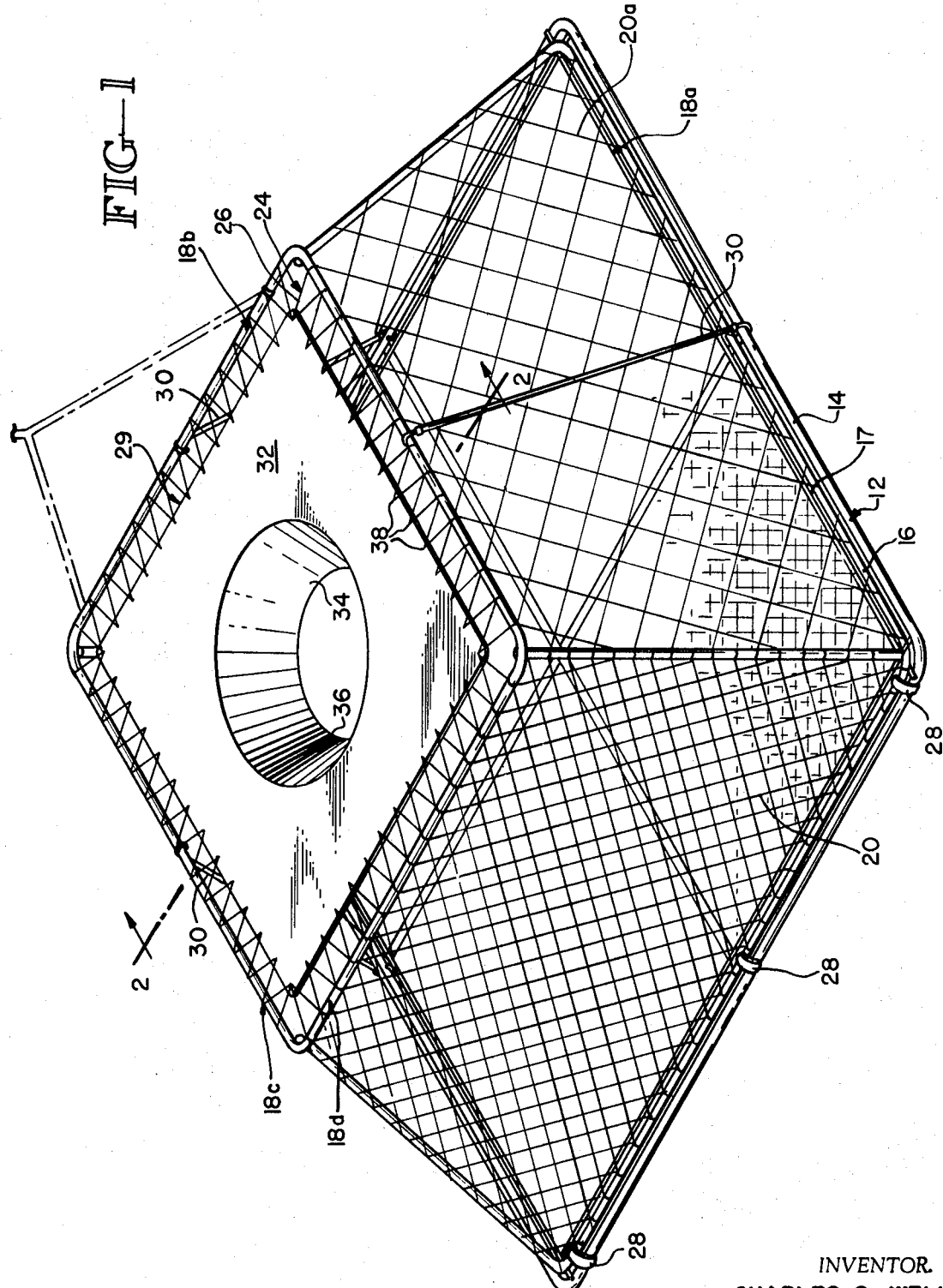

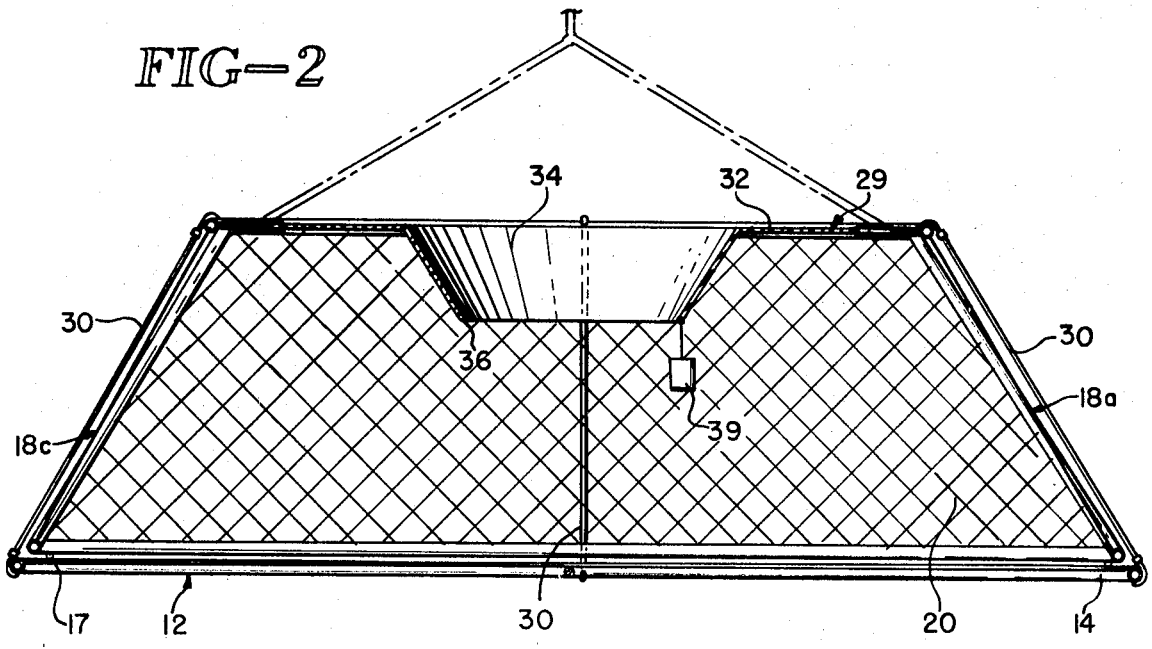

3,605,320
CRAB TRAP
Charles S. Wells, Pier 56, Seattle, Wash. 98101
Filed Aug. 6, 1969, Ser. No. 848,023
Int. Cl. A01k *69/08;* A01m *23/08*
U.S. Cl. 43—65
4 Claims

ABSTRACT OF THE DISCLOSURE

Four upwardly converging side members of crab-restraining netting are joined to top and bottom members of like netting to form a container suitable for holding crab or the like. The top member is provided with a plastic shield having a substantially horizontal surface surrounding a downwardly sloping circular tunnel. The tunnel terminates in an entrance opening a substantial distance above the bottom member. The shield is of an imperforate low-friction plastic so that the crab cannot gain a clawhold to climb back out through the tunnel.

BACKGROUND OF THE INVENTION

Field of the invention

This invention pertains to traps for catching crabs or the like and, more particularly, pertains to crab pots of the type in which the crabs become self-entrapped upon being attracted into the container by a bait.

Description of the prior art

In the past commercial crab traps have employed various techniques for self-entrapping a crab within a container. In one common type the crab entered the trap through an opening in the top of the container. The opening was surrounded by appendages that terminated within the container and which attempted to prevent the crab from climbing back out. In another common type an opening was provided in the side of a container and was covered by a gate which could only swing inwardly but was spring biased closed.

SUMMARY OF THE INVENTION

This invention is directed to a trap for crab or the like that comprises a container having an opening through which the crab may obtain entrance but through which it is virtually impossible for the crab to exit. Basically the invention employs an imperforate, low-friction shield having a substantially horizontal surface surrounding a downwardly sloping surface that terminates a substantial distance above the bottom of the trap. The imperforate shield provides no claw-holds for permitting the crab to climb back out of the trap. The shield also enables the entrapment of a large number of crabs since crabs lured merely to the vicinity of the shield tumble down the downwardly sloping surface even if they do not attempt to climb into the container. A further advantage is that the shield may be made of various materials and may be formed into various shapes.

BRIEF DESCRIPTION OF THE DRAWINGS

FIG. 1 is an isometric illustration of a crab trap embodying the principles of the invention.

FIG. 2 is a vertical section taken along line 2—2 of FIG. 1.

DESCRIPTION OF THE PREFERRED EMBODIMENTS

The preferred form of trap, as illustrated in the drawings, comprises a container having a bottom member 12 formed of a rectangular tubular frame 14 which is covered by a conventional netting 16. The frame includes parallel side braces 17 which support four side members 18a-18d. The side members are formed of upwardly converging tubular frames integrally joined at their corners; in effect forming a truncated pyramid. Each of the side members is covered by conventional netting 20. The netting on one side of the members 18a has larger openings than the netting of the other side members to provide an exit for the smaller immature and female crabs. It is understood, of course, that the size of the openings in the netting of each of the side members depends upon the average size of the crab or the like which is to be entrapped.

A top member 24 includes conventional netting 26 secured to the side members 18a–18d providing a substantially closed container. One side member, such as 18d, is hinged to the bottom member 12 by ropes or metal rings 28. The remaining side members 18a, 18b and 18c are releasably secured to the bottom member 12 by spring or rubber couplings 30. Preferably the bottom member is detached from the side members so that the side members may be nested for shipping or storing. At the site where the traps are to be lowered into the ocean the rings and couplings are installed. The containers are lifted intact when hauled for removing the crab. After the couplings 30 are removed the side members may be pivoted upwardly from the bottom member 12 to obtain access to the crab.

In accordance with the teachings of this invention the top member 24 is provided with a plastic shield 29, probably made of fiberglass or the like, which is molded into a form having a substantially horizontal surface 32 and a downwardly sloping surface 34. The exact shape of the shield may be varied depending upon whether it is used on a top member or as a tunnel in the side member. The surfaces in both cases, however, are of sufficient length so that a large crab cannot again reach the outside netting once having passed down the sloping surface 34. In the preferred form of the invention the downwardly sloping surface 34 is in the form of a circular tunnel terminating in an opening 36 a substantial distance above the bottom member 12. In one example the opening 36 is approximately 17½ inches in diameter being a suitable size for a trap used to catch Alaska king or tanner crab. The horizontal surface 32 is secured to and is supported by the netting 26 of the top member 24 which passes through a plurality of peripheral apertures 38. A suitable bait can 39 is secured to a lower lip of the sloping surface 34. The entire shield is imperforate so that it is virtually impossible for a crab to back off the shield once it has reached the downwardly sloping surface 34 or to climb back out of the trap once it has begun to slide or tumble down the sloping surface. Once in the trap only the immature males or female crabs of sufficiently small size to pass through the large openings in the netting of the side member 18a will become released.

While the preferred form of the invention has been described it should be understood that one skilled in the art may make changes thereto though still embodying the principles in the invention. Accordingly, the form of the invention is to be limited only by the scope of the claims appended hereto.

The embodiments of the invention in which an exclusive property or privilege is claimed are defined as follows:

1. A trap for catching crab and the like comprising: a container having top, bottom and side crab restraining members; an opening in one of said members; a substantially imperforate shield of low friction material surrounding said opening and having a downwardly sloping surface terminating within said container, said side members joining said top member at an obtuse angle so that a crab can push the center of his body onto the top member from the side member and wherein said openings is provided in the top member, said shield includes a substantially flat horizontal surface extending inwardly from said side members a substantial distance whereby a crab can reach said opening only when completely on said shield, and said downwardly sloping surface includes a downwardly and inwardly sloping surface surrounding said opening and smoothly joining said horizontal surface.

2. The trap defined by claim 1 wherein said downwardly and inwardly sloping surface terminates in a circular opening spaced from said bottom crab restraining member.

3. The trap defined by claim 2 wherein said side members are integrally joined and converge upwardly whereby said container is in the shape of a truncated pyramid.

4. A trap for catching crab and the like comprising: a container having top, bottom and side crab restraining members; an opening in one of said members; a substantially imperforate shield of low friction material surrounding said opening and having a downwardly sloping surface terminating within said container, said shield including a substantially flat horizontal surface extending inwardly from a side member a substantial distance whereby a crab can reach said opening only when completely on said shield, said horizontal surface joining said side member at an obtuse angle so that a crab can push the center of his body onto the horizontal surface from the side member.

References Cited

UNITED STATES PATENTS

| | | | |
|---|---|---|---|
| 514,388 | 2/1894 | Smith | 43—65X |
| 710,020 | 9/1902 | Short | 43—65 |
| 2,769,274 | 11/1956 | Ougland | 43—65X |

WARNER H. CAMP, Primary Examiner

U.S. Cl. X.R.

43—100